United States Patent [19]

Zalucky

[11] Patent Number: 4,606,691
[45] Date of Patent: Aug. 19, 1986

[54] BEAM BENDING COMPENSATION

[76] Inventor: Alex Zalucky, 632 NW. 13th St., Boca Raton, Fla. 33432

[21] Appl. No.: 490,975

[22] Filed: Apr. 30, 1983

[51] Int. Cl.$^4$ .............................................. B25J 9/16
[52] U.S. Cl. .................................... 414/680; 212/156; 414/730; 901/9; 901/47
[58] Field of Search .................... 414/735, 730, 5, 680; 901/47, 9; 74/469; 356/372, 376; 250/201, 202, 203 R; 364/560–563; 340/685; 212/156

[56] References Cited

U.S. PATENT DOCUMENTS

| 3,775,012 | 11/1973 | Ling et al. ............................ 356/372 |
| 3,972,429 | 8/1976 | Sigott et al. .......................... 414/685 |
| 4,119,212 | 10/1978 | Flemming ................................ 414/5 |
| 4,285,627 | 8/1981 | Oswald et al. ...................... 414/694 |

OTHER PUBLICATIONS

Automotive Parts & Accessories, J. C. Whitney & Co., Catalog #386B, copyright 1979, p. 117.
R. Klein and C. Nachtigal, *The Application of Active Control to Improve Boring Bar Performance*, Journal of Dynamic Systems, Measurements, and Control, Jun. 1975, beginning at p. 179.

*Primary Examiner*—Donald W. Underwood
*Attorney, Agent, or Firm*—Eugene F. Malin

[57] ABSTRACT

A system designed to reduce cantilever beam deflections is disclosed. Beam deflection is reduced by neutralizing the force causing such deflection. The neutralizing force is achieved by employing a second cantilever beam parallel with the first and connecting the distal ends of the two beams through an active positioning system. In operation, a force applied to the end of the reference beam, in any direction perpendicular to the length of the beam, is in effect, automatically transferred to the second beam. Thus the second beam bends by an amount proportional to the magnitude of the force, while the reference beams remains in the original position. The end result is a beam whose distal end is located in a unique position relative to the proximal end regardless of any disturbance forces acting upon it.

6 Claims, 8 Drawing Figures

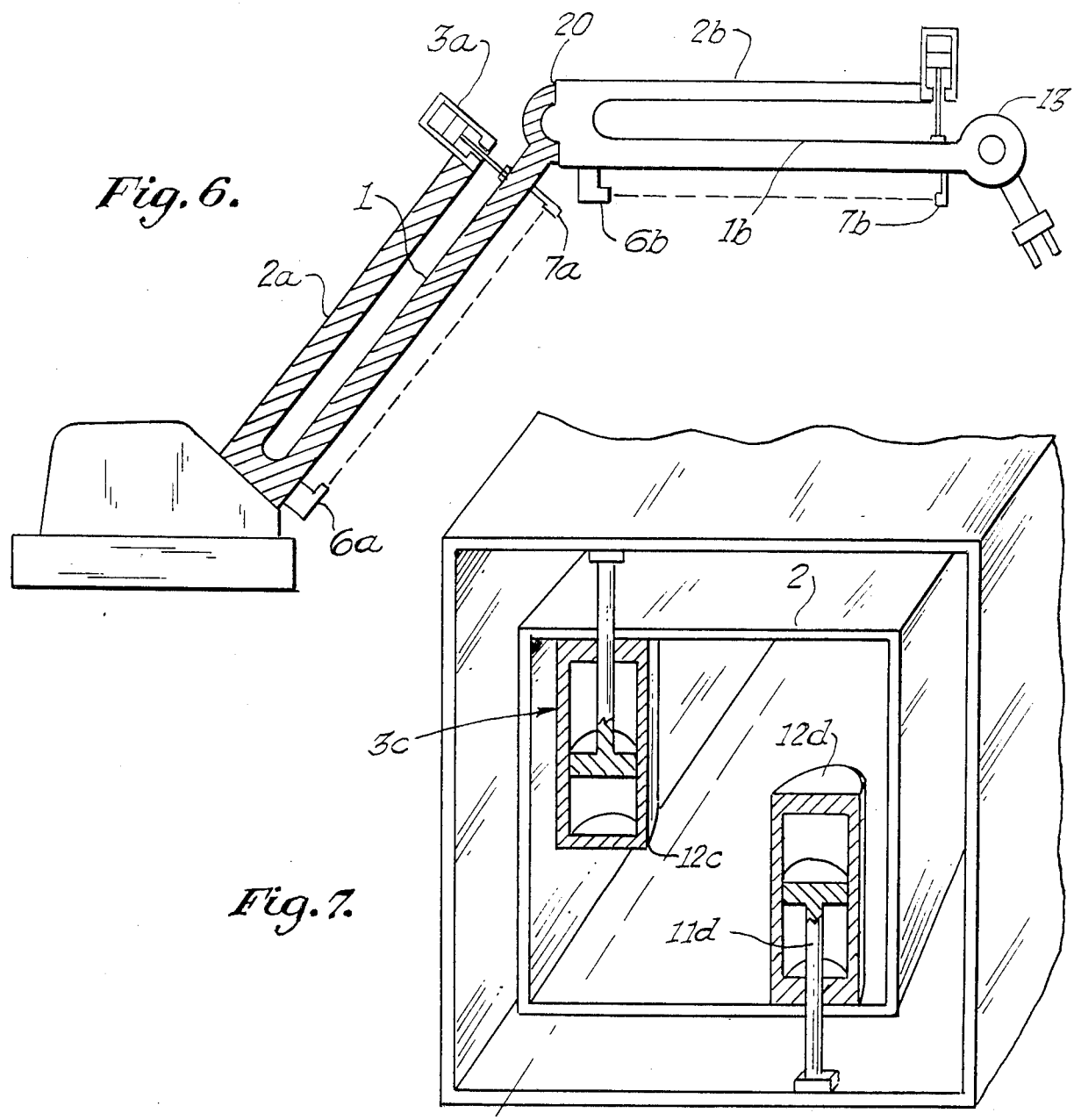
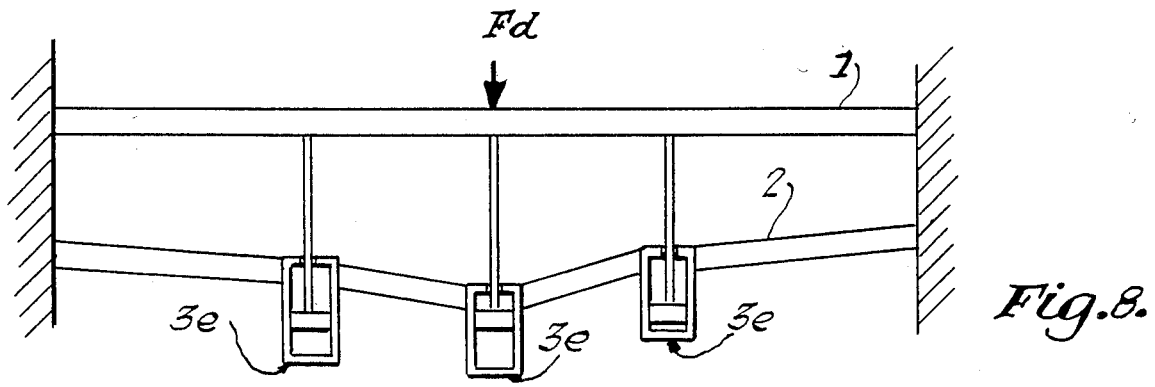

BEAM BENDING COMPENSATION

BACKGROUND OF THE INVENTION

A. Field of the Invention

The invention relates to improving the accuracy and controllability of a manipulator arm by reducing the variability of the location of its distal end, increasing manipulator arm maximum payload without decreasing accuracy, and assuring straightness of a beam, whether it be cantilevered or spanning two fixed ends.

The fact that beams used in manipulators are not perfectly rigid is a problem that has long plagued robot builders. Traditionally, the location of a manipulator's distal end (usually the gripper or tool), henceforth to be called the endpoint, has been computed from angular measurements taken at each of the joints connecting the manipulator's multiple links. Such a scheme, however, assumes that these links are rigid, i.e. deflections of the links are negligible.

It is known though that these links are not perfectly rigid and that they can bend by significant amounts when subjected to outside forces (including gravity), causing changes in endpoint position without affecting angular measurements taken at the joints. Stated in simpler terms, the manipulator's endpoint is not where the manipulator's controller thinks it is.

In an effort to overcome this problem, some have tried to measure the location of the manipulator endpoint directly rather than through the joint angles. This approach faces several major obstacles:

1. In order to fully determine the position and orientation of an object in space (such as the gripper), six separate measurements must be made; i.e. along three translational axes and three rotational axes.

2. Some provisions must be made for tracking of the endpoint by the measurement device in spite of the many possible obstacles between the base and the endpoint. If the measurement path is made to follow the links of the manipulator, the number of measurements will be six times the number of links. Given the complexity involved in such measurements, such a system, if it were to be developed, would be extremely expensive.

3. Assuming, nevertheless, that such a measurement system were employed, there remains the task of making the manipulator able to quickly and predictably make use of this information by adjusting the neccessary joint angles in such a way as to place the endpoint in the required position and orientation. Since all the links would be subjected to bending deformation, and since cantilever bending causes a rotation as well as a translation of the disital end, the required corrective action would be very computation intensive and would neccessitate rapid motion from all actuators. It is not likely that such action could be taken without creating a significant time delay.

B. Prior Art

Flemming, in his U.S. Patent, disclosed a system designed to attack the problem in a manner similar to that described above. However he made no provision for the actuation scheme required to carry out the intended motion.

Klein and Nachtigal, in their paper "The Application of Active Control to Improve Boring Bar Performance," in the June, 1975 edition of *Journal of Dynamic Systems, Measurement and Control* beginning at p. 179, described their successful experiment in which a thin cantilever bar was controlled in one degree of freedom at its base based on position information obtained at the endpoint. However their idea would suffer from all the problems described above if it were to be expanded to a multidegree-of-freedom manipulator.

SUMMARY OF THE INVENTION

Accordingly, it is an object of this invention to avoid the problems associated with attempted rapid correction of position errors caused by beam deflections. This is accomplished not by overcoming the beam bending but by reducing or eliminating it altogether. When bending is kept within very tight tolerances, the rigid beam assumption for manipulators becomes valid for much greater payloads and accelerations, i.e. the distal point's location can be accurately predicted from the joint angles.

Another object of this invention is to provide a secondary actuation system for the manipulator which would make use of the proposed actuation system to allow rapid changes in manipulator position over small displacements.

In accordance with these and other objects which will be apparent hereinafter, the instant invention will now be described with particular reference to the accompanying drawings.

A preferred embodiment of this invention employs two actuators per beam (link) in order to provide bending neutralization in all directions. Some applications may require added rigidity in only one direction, in which case only one actuator per beam would be required. Other applications may require neutralization of beam twisting. The same principle may then be applied to eliminate reference beam twist by using a rotary actuator, or a combination of linear actuators, to develop an equal and opposite twisting force from the secondary beam.

The preferred embodiment employs hydraulic actuators and high-speed flow control servovalves to control the relative motion between the two beams. Other embodiments may make use of electric motors along with gears, levers, or leadscrews to achieve the equivalent relative motion, although these would cause slower actuator response. Pneumatic power can also be used in place of hydraulic, especially when the application does not require high force.

The preferred embodiment employs an optical sensor to measure the perpendicular displacement of each beam's distal end relative to its proximal end. Other methods may be used, notably, strain measurements made on the reference beam could take the place of direct displacement measurement.

In a different, simpler embodiment, this invention can be used to reduce the deflection of a beam span at points between its fixed ends by placing such systems at locations along the span.

BRIEF DESCRIPTION OF THE DRAWINGS

In the accompanying drawings:

FIG. 6 gives an example of system implementation for two manipulator links in series.

FIG. 7 shows an implementation of the system to negate torsional as well as perpendicular bending.

FIG. 8 shows an implementation for reducing span deflection.

DETAILED DESCRIPTION OF THE INVENTION

Figure 1:
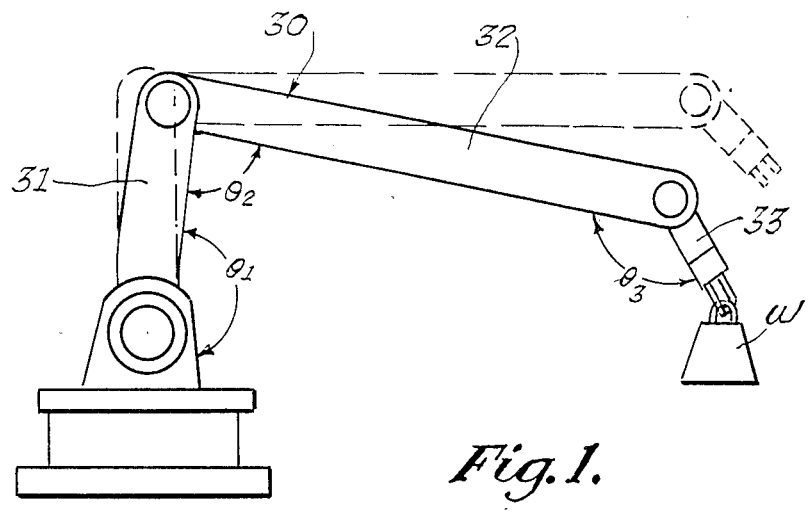
FIG. 1 is an exaggerated representation of breakdown of the rigid beam assumption for a manipulator.

FIG. 1 shows a triply articulated robot arm 30 deformed under loading W. Each articulation 31, 32, 33 of the arm is in practical effect a cantileverd beam, i.e. supported at one end and loaded at other. Arm 30's position under no load is shown in the figure by dotted lines. The angles $\theta1$, $\theta2$, $\theta3$ that are conventionally used to calculate the position of load W are seen to have remained virtually the same, even though deformation of arms 31, 32 and 33 cause W to have been displaced.

Figure 2:
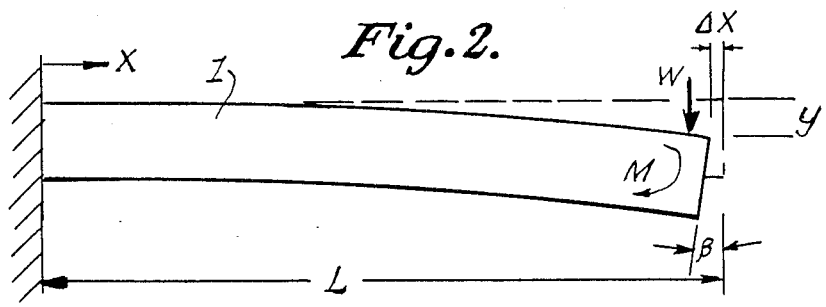
FIG. 2 is a model of a basic cantilever beam subjected to both a force and a moment at its distal end.
Figure 3:
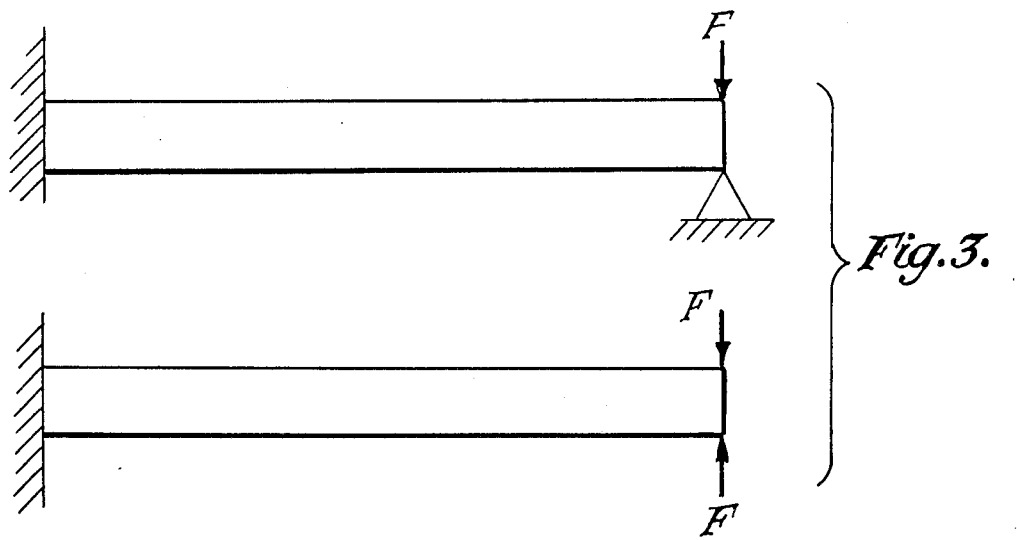
FIG. 3 is an illustration of the principle of this invention; the introduction of an equal and opposite force designed to reduce beam deflection.

FIG. 2 shows deformations of a cantilever beam resulting from loading W perpendicular to the elongate direction (X) of the beam. Load W causes deformation y along W's line of action, and $\Delta X$ perpendicular to W's line of action. The nature of cantilever beam bending causes the beam to bend through an angle $\beta$. These deformations are removed by counteracting load W, as illustrated in FIG. 3.

In particular, this deformation is offset by placing a second elongate member 2 proximate to elongate beam 1 (shown best in FIG. 4, where member 2 is shown inside member 1, and in FIG 6, in which member 2 is shown alongside member 1) and mechanically coupling these so that force on the latter is transmitted to the former. The result is that the second member, but not the beam, deforms.

Figure 4:
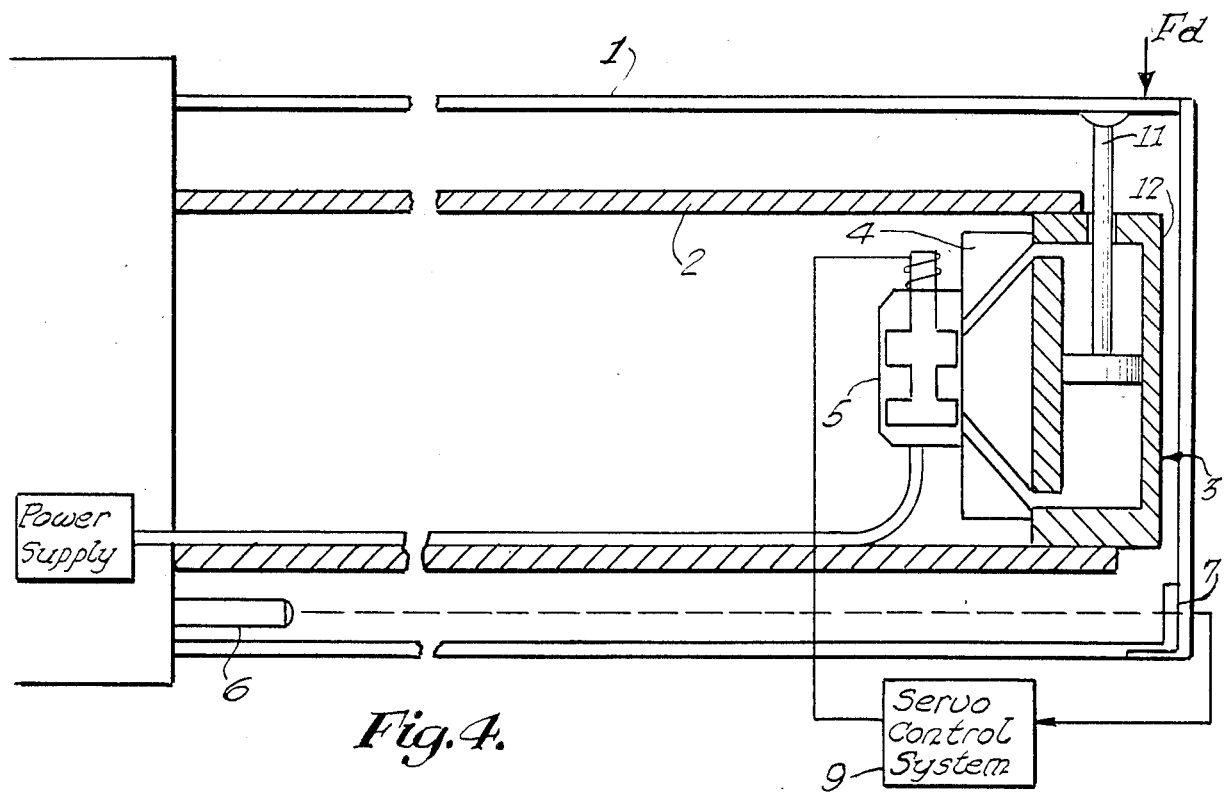
FIG. 4 shows, schematically, an embodiment of the system as applied to a single beam or link. The system illustrated is for one degree-of-freedom of motion.

In FIG. 4 is shown an actuator system 3 for controlling the amount of force communicated between members 1 and 2. A light source 6, preferably a illuminated beam, shines on detector 7, for example a photodiode or photodiode array. If the elongate mechanical member, here cantilevered beam 1, deforms, detector 7 ceases to be illuminated wholly or in part, thus causing contol system 9 to send a correction signal to servovalve 5, for example solenoid valve 5, which fluidly transmits the signal through manifold 4 to piston 11, and piston cylinder 12. Cylinder 12 is fixed to the second elongate member, and piston 11 abutts the beam 1. By manipulating the piston 11, 12 via manifold 4, the force between members 1 and 2 is varied such that deformation on member 1 is relieved. The invention is not limited to lights and photodetectors, but comprehends any appropriate scheme that can detect beam deformation and generate a control signal in response thereto. An alternative detector could be a simple scale system that directly measures the load magnitude and computes an appropriate feedback signal.

Figure 5:
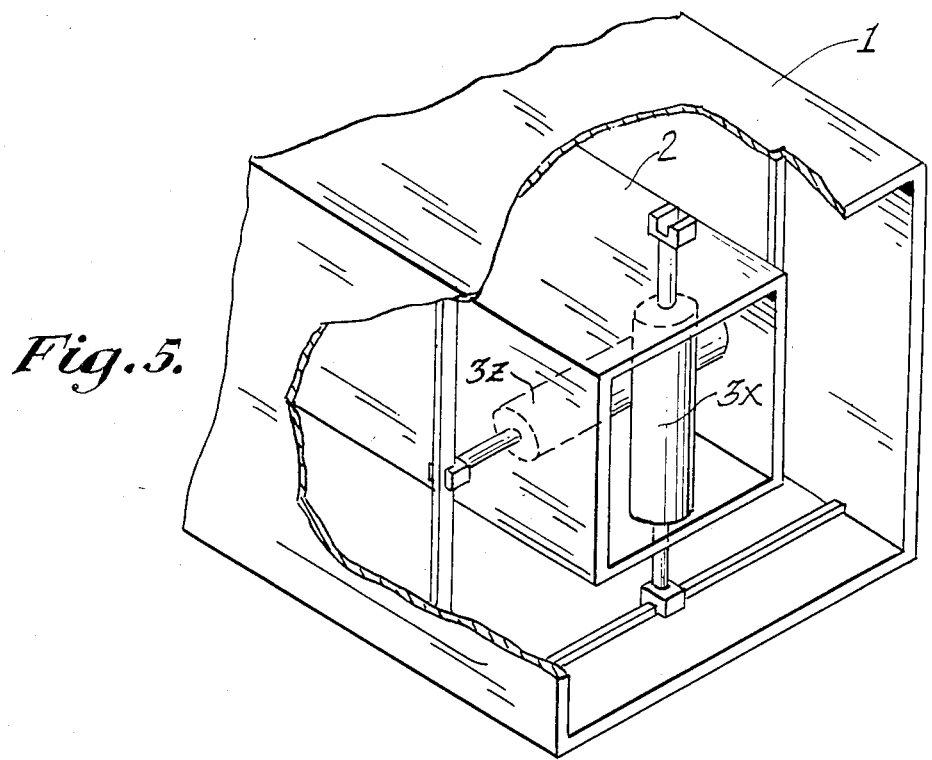
FIG. 5 shows an example of system implementation for two degree-off-freedom motion.

FIG. 5 shows the invention adapted to counteract beam deformations in two spacial directions (two degrees of freedom of movement). In particular, actuators 3y and 3z are arranged perpendicular to one another to counteract beam deformation in the y and z directions respectively. Here, as before, the forces on beam 1 are transferred to elongate member 2. (The z direction is that spacial direction perpendicular to both the x and y directions shown in FIG. 2.)

FIG. 6 shows the invention adapted to counteract deformation in a doubly articulated arm 1a, 1b. Each link has its respective second elongate member 2a, 2b and its respective actuators 3a, 3b. The two systems are joined by a rotary actuator 20 as in many existing manipulators. Thanks to information supplied by sensor 7a responsive to l ight source 6a, actuator 3a keeps beam 1a's distal end in a unique location with respect to the base 21. Similarly, with light source 6b, sensor 7b and actuator 3b keep the distal end of beam 1b in a unique location with respect to the proximal end of beam 1b. As a result the location of the manipulator's endpoint can be accurately predicted by using the position angles of actuators 20 and 13.

FIG. 7 shows the invention modified to deal with torsional bending. The vertical actuator has been replaced by two vertical actuators 3c, 3d having cylinders 12c, 12d, and pistons 11c, 11d, offset horizontally from one another, and a twisting moment is created between the inner beam 2 and the reference beam 1. This moment can be used to negate an external disturbance moment, provided that a sensor is used to determine the rotational position of the reference beam's distal end relative to its proximal end.

FIG. 8 shows an embodiment designed to reduce deflections in a span. Actuators 3e are positioned at multiple locations along the span. Their job is to keep beam 1 straight at the expense of beam 2 which will bend to absorb the disturbance force Fd. In this embodiment, each actuator would require its own feedback signal containing information on beam 1's total displacement.

This invention is the product of research done in partial fulfillment of the inventor's Master of Science Degree at the Massachusetts Institute of Technology, the corresponding dissertation being attached hereto and made part of this disclosure.

It is to be understood that piston 11, 12 and servovalve 5 might be replaced by functionally equivalent levers, pulleys, gears, etc., and detector 5 and control system 5 replaced by, e.g. functionally equivalent electronics. Indeed, the instant invention has been shown and described herein in what is considered to be the most practical and preferred embodiment. It is recognized, however, that departures may be made therefrom within the scope of the invention and that obvious modifications will occur to a person skilled in the art.

What I claim:

1. In an apparatus comprising an elongate mechanical member, said member exposed to mechanical load, a means for neutralizing load-induced deformation of said elongate mechanical member, said means comprising a correction means adapted to exert a force on said elongate mechanical member effective to offset said deformation;

wherein said correction means comprises a further mechanical member movably coupled to said elongate mechanical member;

wherein said correction means comprises a coupling means connected between said elongate mechanical member and said further mechanical member for transmitting said force from said further mechanical member to said elongate mechanical member, a detector means connected between said elongate mechanical member and said further mechanical member for determining the magnitude and direction of said deformation of said elongate mechanical member, and a feedback means for causing said correction means to exert said force on said elongate mechanical member.

2. In a robot apparatus, the apparatus comprising at least one elongate mechanical member, said member exposed to mechanical load, a means for neutralizing load-induced deformation of said elongate mechanical member, said means comprising a correction means adapted to exert a force on said elongate mechanical member effective to offset said deformation;

wherein said correction means comprises a further mechanical member movably coupled to said elongate mechanical member;

wherein said correction means comprises a coupling means connected between said elongate mechanical member and said further mechanical member for transmitting said force from said further mechanical member to said elongate mechanical member, a detector means connected between said elongate mechanical member and said further mechanical member for determining the magnitude and direction of said deformation of said elongate mechanical member, and a feedback means for causing said correction means to exert said force on said elongate mechanical member.

3. The apparatus of claim 1 or 2, wherein the detector means comprises a photodetector located on one end of said elongate mechanical member, and a light on the other end, said photodetector and light cooperating to provide an electrical signal to said feedback means substantially proportional to said load induced deformation.

4. The apparatus of claim 1 or 2, wherein said coupling means comprises a first means attached to said elongate mechanical member, a second means attached to said further mechanical member, and said correction means comprises a servo-controlled positioning system, said first and second means being effective to cause said correction means to exert said force responsive to the operation of said system responsive to said detector.

5. The apparatus of claim 4, wherein said servo-controlled positioning system is a servo-controlled fluid system.

6. The apparatus of claim 5 wherein said elongate mechanical member is free to undergo said deformation through plural degrees of freedom of movement, and said correction means comprises more than one coupling means, each said more than one coupling means arranged effective to neutralize said deformation in each of said plural degrees of freedom of movement.

* * * * *